United States Patent Office.

JOHN F. BOYNTON, OF SYRACUSE, NEW YORK.

Letters Patent No. 60,830, dated January 1, 1867.

---

IMPROVED ROOFING MATERIAL.

---

The Schedule referred to in these Letters Patent and making part of the same.

---

TO ALL WHOM IT MAY CONCERN:

Be it known that I, JOHN F. BOYNTON, of the city of Syracuse, county of Onondaga, and State of New York, have invented a new and useful Roofing Composition, to be used in the place of shingles, tin, pitch, felt, gravel, and all other articles heretofore used; and I hereby declare the following to be a full, clear, and exact description of the same.

It is a well-known fact that gas tar, and the many products distilled from it, and the pitch left after distillation, will enter into combination with many materials, forming valuable paints, cements, and other compounds remarkable for their resistance to the actions of the elements, and have been used in many ways for constructing side-walks, roofing buildings, and other like purposes; and that these products, when mingled with other suitable substances, secure us a far greater protection against fire and water than any roofs constructed of wood. Having been several years manufacturing, from gas tar and other pitchy substances, various materials, forming many compounds from the same, I have learned that when peat, much decayed vegetable matters, mineral coals, ground or pulverized ligneous and fibrous materials, are commingled in an appropriate manner with gas tar, vegetable tar, asphaltums and their products, they form cements, which, when spread on cloth, felt, paper, or other suitable fabrics, form the most valuable roofing materials, and that these may be made incombustible by mingling in their composition small quantities of inorganic substances, such as mineral oxides, silicates, and carbonates, some of which when mingled will form new insoluble compounds, which, like stone or slate, will resist the action of frost, rain, or sunshine.

To enable others skilled in the art to make and use my invention, I will proceed to describe one method of preparing its composition.

I put in a sink or bin forty gallons of gas tar, or in this proportion: twenty gallons of pitch with ten gallons of the products distilled from tar, or a sufficient quantity of the oily products to soften the pitch to the consistency of ordinary gas tar, to which I add the following materials, after having thoroughly dried and pulverized them: twenty pounds of the silicate of alumina, twenty pounds of the (anhydrous) carbonate of lime, three pounds sulphate of iron, two pounds of sulphate and one pound of chloride of calcium. I thoroughly mix and incorporate these ingredients, which may then be thickened up with peat, muck, or ligneous and fibrous materials to the consistency of ordinary mortar; when too thick they may be reduced by an addition of dissolved pitch or tar; or the peat, turf, muck, or muck-mud, with the ligneous and fibrous materials, may be mixed directly with the tar or pitch dissolved in distillates from tar.

Having described the modes of mingling the above-named substances, I do not wish to claim the use of all the silicates as above named, having used some of them in various compounds and mixtures for several years, and having heard of some of them being used by others for bricks and sewer pipes; nor do I wish to claim the use of sulphur, having described its combinations with bituminous substances in a caveat of eighteen hundred and sixty-one; neither do I wish to confine myself to the exact proportions as herein described, for as vegetable and gas tars vary much in their composition and consistency, the compounder will be governed somewhat by circumstances and the qualities of the materials used.

What I claim, and desire to secure by Letters Patent, is—

1. The combination of peat with gas tar or gas tar products, as and for the purpose described.
2. I claim the combination of muck with gas tar or gas tar products, as and for the purpose described.
3. I claim the combination of ground ligneous and fibrous materials, peat and muck, with gas tar or gas tar products, for the purpose described.
4. I claim peat, muck, and disintegrated ligneous and ground fibrous materials combined with asphaltums, gas tar, and its products, substantially as set forth and for the purposes herein described.
5. I claim the combination of the silicate of soda, silicate of magnesia, and the chloride of calcium, for the purposes above specified.

JOHN F. BOYNTON.

Witnesses:
J. J. COOMBS,
EDM. F. BROWN.